United States Patent [19]

Skarpetowski

[11] Patent Number: 5,331,537
[45] Date of Patent: Jul. 19, 1994

[54] METHOD OF CONTROLLING ELECTRIC VALVES OF A CONVERTER

[75] Inventor: Grzegorz Skarpetowski, Turgi, Switzerland

[73] Assignee: Asea Brown Boveri Ltd., Baden, Switzerland

[21] Appl. No.: 864,225

[22] Filed: Apr. 6, 1992

[30] Foreign Application Priority Data

Apr. 8, 1991 [DE] Fed. Rep. of Germany ....... 4111226

[51] Int. Cl.$^5$ ............................................ H02M 7/515
[52] U.S. Cl. .................................... 363/138; 363/96; 318/811; 388/811
[58] Field of Search .................. 363/85, 96, 135, 41, 363/35, 36, 37, 95, 136, 137, 138; 318/811; 388/811

[56] References Cited

U.S. PATENT DOCUMENTS

| | | | |
|---|---|---|---|
| 4,079,443 | 3/1978 | Udvardi-Lakos et al. | 363/49 |
| 4,403,280 | 9/1983 | Okado | 363/96 |
| 4,517,635 | 5/1985 | Kelley, Jr. | 363/136 |
| 4,599,549 | 7/1986 | Mutoh et al. | 318/798 |
| 4,758,939 | 7/1988 | Matsuo et al. | 363/68 |
| 4,802,077 | 1/1989 | Fujii et al. | 363/41 |
| 4,833,586 | 5/1989 | Inaba et al. | 363/41 |
| 4,903,188 | 2/1990 | Madhayan et al. | 363/96 |
| 5,235,503 | 8/1993 | Stemmler | 363/37 |

FOREIGN PATENT DOCUMENTS

| | | |
|---|---|---|
| 3403802A1 | 8/1984 | Fed. Rep. of Germany. |
| 2929260C2 | 3/1987 | Fed. Rep. of Germany. |
| 1220071A | 3/1986 | U.S.S.R. |
| 1610566A1 | 11/1990 | U.S.S.R. |

OTHER PUBLICATIONS

"Fully Digital-Controlled PWM Inverter With Software Based Modulation For AC Machine Control", John E. Pedersen et al, *16th Annual Conference of IEEE Industrial Electronics Society*, 1990, pp. 995-10001.

"Direkte Selbstregelung, ein neuartiges Regelverfahren fur Traktionsantriebe im Ersteinsatz bei dieselelektrischen Lokomotiven", Michael Janecke et al, *Elektrische Bahnen*, 1991, pp. 79-87.

"Quick Response Space Vector Control for a High Power Three-Level-Inverter Drive System", Bauer, et al., EPE Aachen 1989, pp. 417-421.

"New Developments of 3-Level PWM Strategies", Velaerts, et al., EPE Aachen 1989, pp. 411-416.

"Requirements on the Control of a Three-Level Four Quadrant Power Converter in a Traction Application", Bachle, et al., EPE Aachen 1989, pp. 577-582.

"Synthesis of Active and Reactive Power Controllers for the Slip Power Recovery Drive", Marques, EPE Aachen 1989, pp. 829-833.

*Primary Examiner*—R. Skudy
*Assistant Examiner*—Adolf Berhane
*Attorney, Agent, or Firm*—Burns, Doane, Swecker & Mathis

[57] ABSTRACT

Method of controlling electric valves of a converter using a universal algorithm for generating pilot signals (11) for multistage and multiphase line- and self-commutated converters (13, 14) is specified, by means of which it is possible to control different types of converters. The control algorithm can be realized as hardware or software. The invention is particularly suitable for multisystem locomotives. It is possible to change over to another feed system of the locomotive by a simple reprograming of a modulator (9) of a pilot signal generator (10). The modulator (9) and a pulse generator (8) receive modulator control signals (7) or pulse generator control signals (6) from a setter (5), together with which they form the pilot signal generator (10).

11 Claims, 5 Drawing Sheets

METHOD OF CONTROLLING ELECTRIC VALVES OF A CONVERTER

BACKGROUND OF THE INVENTION

1. Field of the Invention

The invention proceeds from a method for controlling electric valves of a converter.

2. Discussion of Background

The invention refers to a prior art such as is disclosed by F. Bauer and H.-D. Heining, QUICK RESPONSE SPACE VECTOR CONTROL FOR A HIGH POWER THREE-LEVEL-INVERTER DRIVE SYSTEM, 3rd European Conference on Power Electronics and Applications, EPE Aachen, 9-12 Oct. 1989, Vol. 1, pages 417-420. A flux computer is used there for the field-oriented control of a converter-fed induction machine. GTO thyristors of a 3-level inverter are controled by means of pulse-duration modulation. Both the field-oriented control and the generation of the pulse patterns are implemented in a digital signal processor. In this case, each converter type requires a special control program or a special control circuit.

SUMMARY OF THE INVENTION

Accordingly, as defined in claim 1, the invention achieves the object of further developing a method for controlling electric valves of a converter of the type mentioned at the beginning in such a way that different types of converters can be controlled according to a general algorithm.

An advantage of the invention consists in that a universal algorithm is available for generating the valve or thyristor commands for multistage and multiphase line- and self-commutated converters. The control need not be programed afresh for each converter type. The control algorithm can be realized as hardware or software.

The multiplicity of converter pulse duration modulators in the field of power electronics can be limited to 1-3 types. It is possible as a result to save on development costs, in particular for low quantities and exotic individual solutions.

BRIEF DESCRIPTION OF THE DRAWINGS

A more complete appreciation of the invention and many of the attendant advantages thereof will be readily receiveved as the same becomes better understood by reference to the following detailed description when considered in connection with the accompanying drawings, wherein.

DESCRIPTION OF THE PREFERRED EMBODIMENTS

Figure 1:
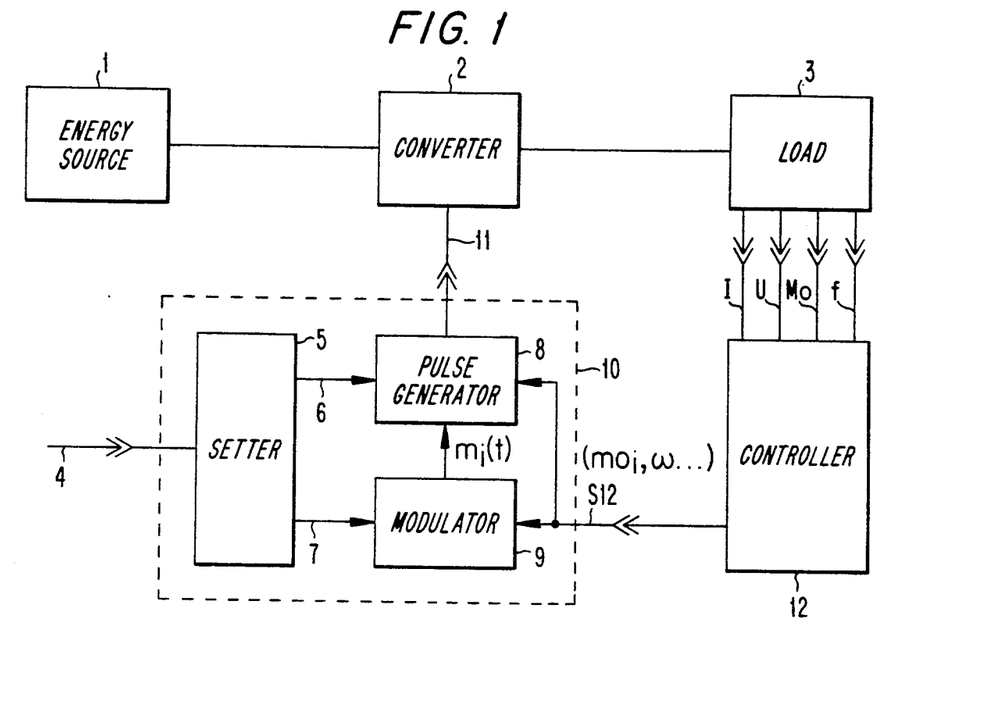
FIG. 1 shows a block diagram of a load or process fed by a converter, with a pilot signal generator according to the invention for generating pilot signals for the converter.

Referring now to the drawings, wherein like reference numerals designate identical or corresponding parts throughout the several views, in FIG. 1 (1) denotes an energy source or an AC voltage or DC voltage source from which an electric consumer or a load or an electric machine or a process (3) is fed with electrical energy via controllable electric valves or an inverter or converter (2). An AC signal (I), an AC voltage signal (U), a torque signal (Mo) and a frequency signal (f), for example, are detected by the process (3) and fed to a controller (12). On the output side, said controller (12) delivers control signals (S12) to a pulser or pulse generator (8) and to a modulator (9) of a pilot signal generator (10). The control signals (S12) can comprise modulation depth parameter signals ($mO_i$) and an angular frequency signal ($\omega$) of the AC voltage (U), (i) denoting a control variable for AC phases (R, S, T). On the input side, the modulator (9) receives further modulator control signals (7) from a programing element or setter (5) of the pilot signal generator (10). On the input side, the setter (5) receives prescribable setting signals (4). The pulse generator (8) receives from the setter (5) pulse generator control signals (6), and from the modulator (9) a signal corresponding to a modulation function ($m_i(t)$); on the output side, it delivers trigger signals or pilot signals (11) to the converter (2). The pilot signals (11) can be optical signals transmitted by means of glass fibers, or electrical signals amplified by means of an amplifier that is not represented.

The pilot signal generator (10) according to the invention represents the element of the power electronic system which is connected directly upstream of the converter (2) to the interface between a controlling electronic system and the power circuit. The pilot signal generator (10) receives input variables from the controller (12) and from the part of the electronic system which contains the control process of the converter.

Figure 2:
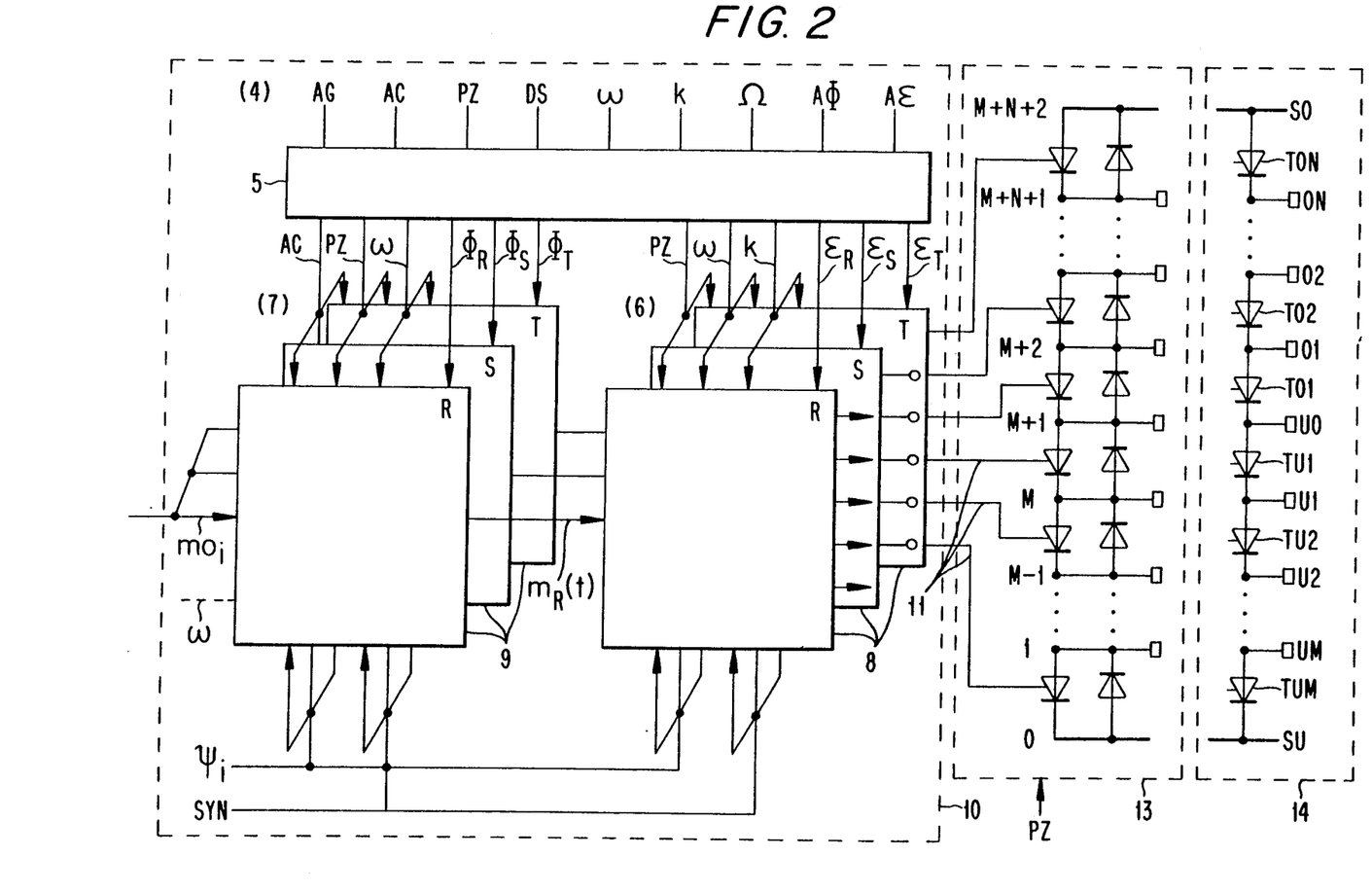
FIG. 2 shows a block diagram of a pilot signal generator for a 3-phase converter having 3 valve chains, FIGS. 3 $a)$-$f)$ show converter circuits having only one thyristor chain, FIGS. 4 $a)$-$e)$ show converter circuits having 2 thyristor chains, FIGS. 5 $a)$-$c)$ show converter circuits having 3 thyristor chains.

Represented in FIG. 2 is a pilot signal generator (10) for a converter (2) having 3 phases (R, S, T), which drives 3 bidirectional, half-controlled valve chains (13) by means of pilot signals (11), only one of 3 valve chains relating to the phase (T) being represented, for the sake of clarity. A diode is connected antiparallel to each thyristor of the valve chain (13). (M) denotes the number of lower valve terminals (U1 . . . UM) between a lower busbar (SU) and a zero terminal or output terminal (UO). (N) denotes the number of upper valve terminals (01 . . . ON) between an upper busbar (SO) and the zero terminal (UO). The number of points of the converter (13) is denoted by PZ=0, . . . M−1, M, M+1, M+2, . . . M+N+1, M+N+2.

Instead of the bidirectional, half-controlled valve chain (13), it is also possible, for example, to provide a unidirectional, fully controlled valve chain (14) having a series circuit of thyristors (TUM, . . . TU2, TU1, TO1, TO2, . . . TON). The same designations also hold for the valve chain (13) (not represented).

The pilot signal generator (10) has only one setter (5), but one modulator (9) each and one pulse generator (8) each per phase (R, S, T).

Figure 5A:
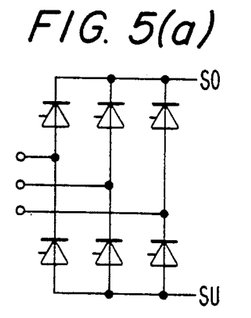
Figure 5B:
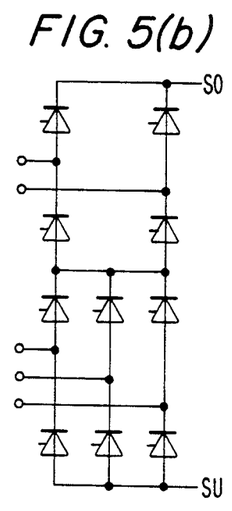
Figure 5C:
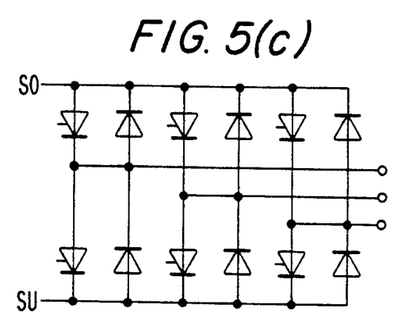

It is the task of the setter (5), which contains the programing parameters of the pilot signal generator (10)

to make the data, once they have been set by the higher-order level, periodically available to a modulator (9) or a group of modulators (9) and pulse generators (8) after appropriate processing, which must also take account of circuit data determined according to a self-test. The setter (5) receives the following signals as setting signals (4):

- AG = number of valve chains (13, 14) having the same fundamental-wave phase,
- AC = operating current parameter, characteristic for AC or DC operation,
  AC = 1 signifies AC/AC voltage operation,
  AC = 0 denotes DC/DC voltage operation, such as in the case of a 1-quadrant converter in accordance with FIGS. 3 $d$) and 3 $e$), for example,
- PZ = valve chain length parameter, number of thyristors connected in series per valve chain,
  PZ = 2 = two-point circuit,
  PZ = 3 = three-point circuit,
  PZ = 4 = four-point circuit,
- DS = parameter of the double-sided load feed,
  DS = 0 = one-sided feed, e.g. of an inverter to a star-connected asynchronous machine in accordance with FIG. 5 $c$),
  DS = 1 = double-sided feed, e.g. of a transformer winding in a four-quadrant converter in accordance with FIG. 4 $d$),
- $\omega$ = angular frequency of the AC voltage $(U) = 2 \cdot \pi \cdot f$, f = frequency of the AC voltage (U),
- k = parameter of the synchronous timing, order of multiplicity of the timing,
- $\Omega$ = angular frequency of the timing = $k \cdot \omega = 2 \cdot \pi \cdot f_t$ for AC = 1, $f_t$ = clock frequency,
- A$\Phi$ = number of valve chains with fundamental-wave shift, and
- A$\epsilon$ = number of independent valve chains with shifted pulse pattern.

The modulator (9) receives from the setter (5) as modulator control signals (7) the following signals: AC, PZ, $\omega$ and

- $\Phi_R$, $\Phi_S$, $\Phi_T$ = initial angular positions of the fundamental-wave of the valve chains (R, S, T). Generalizing, the initial angular positions are denoted by ($\Phi_i$), where i = 1, 2, ... A$\Phi$·AG is a control variable for AC phases.

The pulse generator (8) receives from the setter (5) as pulse generator control signals (6) the following signals: PZ, $\omega$, k and

- $\epsilon_R$, $\epsilon_S$, $\epsilon_T$ = initial values of the pulse pattern angular position with regard to the pulse pattern shifted chains. Generalizing, the initial values of the pulse pattern angular position are denoted by ($\epsilon_j$), where j = 1, 2, ... A$\epsilon$·A$\Phi$ denotes a control variable for pulse patterns.

The angular frequency signal ($\omega$) for the pulse generator (8) and the modulator (9) can also come from the controller (12) in the case of an inverter (2). The pulse generator (8) and the modulator (9) each receive from the controller (12) together with the control signals (S12) a synchronization signal (SYN) and a controller correction angle signal ($\psi_i$) in accordance with a controller fundamental-wave angular position. In the case of vector controllers (12), it is also possible to output only a modulation depth parameter (mO$_i$) and a controller correction angle signal ($\psi_i$). The modulator (9) receives from the controller (12) modulation depth parameters (mO$_i$) and, if necessary, the angular frequency signal ($\omega$).

It is the task of the modulator (9) to generate the modulation function ($m_i(t)$) from a minimum number of data. Very many, but not all cases can be covered by a general analytical representation. Specially adapted equations need to be used for simple line converters or such special modulation functions ($m_i(t)$) which occur, for example, in direct self-regulation. The modulation function ($m_i(t)$) decides on the appearance of the pulse train that is generated by the pulse generator (8).

A very general form of the modulator (9) calculates the time-dependent modulation function:

$$m_i(t) = (PZ-1) \cdot \{AC = mO_i \cos(AC \cdot (\omega \cdot t - (\Phi_i + \psi_i)))\} / (AC+1),$$

where t denotes the time, the index i a control variable for characterizing the AC phase (R, S, T), mO$_i$ a parameter of the modulation depth, $\Phi_i$ the initial angular position and $\psi_i$ a controller correction angle of an i-th valve chain circuit, i = 1, 2, ... A$\Phi$.

The modulation function ($m_i(t)$) gives the amplitude, frequency and the phase of the variable (current/voltage) to be generated by the converter (2).

The pulse generator (8) generates from its input data a time-dependent multilevel function or distribution or commutation function $KF_{ij}(t)$ in accordance with the equation:

$$KF_{ij}(t) = m_i(t) + (2/\pi) \cdot \sum_{n=1}^{n1} \{\sin(n \cdot \pi \cdot m_i(t)) \cdot \cos(n \cdot k \cdot (\omega \cdot t - (\epsilon_j + \Phi_i + \psi_i)))\}/n,$$

where n denotes a control variable, n1 an accuracy characteristic and $\epsilon_j$ the initial value of the J-th pulse pattern of the valve chain circuits with the same index. The initial angle signal ($\Phi_i$) can be transmitted to the pulse generator (8) via the modulator (9) or directly from the setter (5) (not represented).

The accuracy of the calculation increases with the number of terms of the sum. n1 is preferably chosen in the range between 20 and 100.

The output signals (11) of the pulse generator (8) correspond to the routing directives of the thyristors (TUM ... TON); they are received with the aid of PZ comparators for realizing the Heaviside function H(x) specified further below from the commutation function $KF_{ij}(t)$. Measures for error monitoring and for preventing short circuits can be provided in the pulse generator (8) or in an additional device (not represented).

The pilot signal generator (10) can be realized in hardware or software. It can be used to drive converters (2) having valve chains (13, 14) of arbitrary length. The number of stages or the number of points PZ is provided as chain length parameter.

Figure 3A:
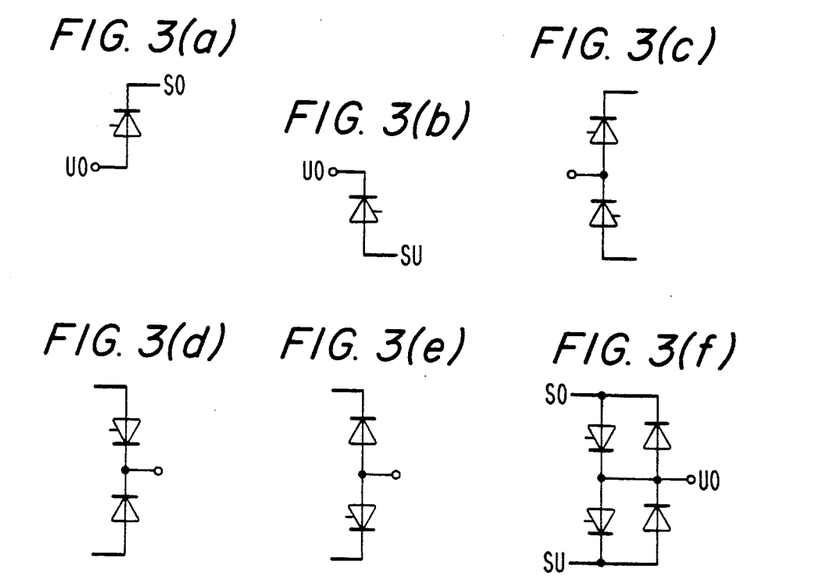
Figure 4A:
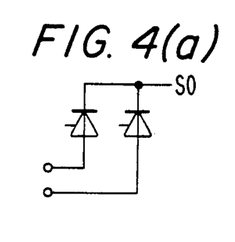
Figure 4B:
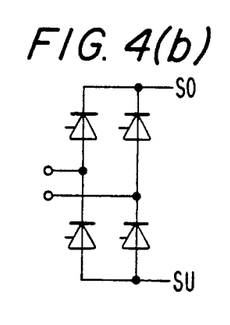
Figure 4C:
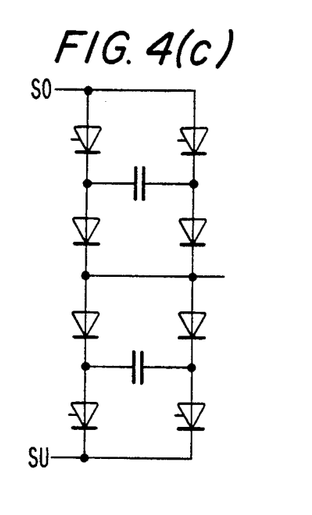
Figure 4D:
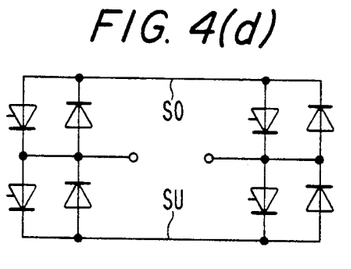
Figure 4E:
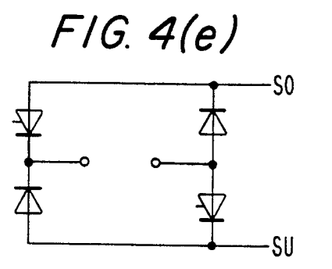

FIGS. 3-5 show application examples of the algorithm according to the invention, the designations corresponding to those of the valve chain (14). In this case, FIG. 3 shows converters (2) which consist only of one valve chain or of a part of a valve chain.

FIGS. 3$a$)-3$c$) show 1-phase converters. FIG. 3$d$) shows a 1-quadrant current converter, FIG. 3$e$) a 1-quadrant voltage converter, and FIG. 3$f$) a 2-quadrant converter.

The converter (2) of this group can thus be driven by only one module or modulator (9) and pulse generator (8).

In the case of the converters (2) having 2 thyristor chains, it is necessary to use 2 such software or hardware modules. These include the following converters (2):

FIG. 4a): 1-phase star connection,

FIG. 4b): 1-phase bridge circuit having all types of control such as gating, gating and clipping (sector control) and in many designs such as, for example, a sequencing circuit on the DC side, which represents a type of electronic step switch, FIG. 4c): 1-phase circuit according to the principle of interphase commutation, FIG. 4 d): four-quadrant converter (one circuit of a four-quadrant converter or one circuit of a voltage inverter for the connection of an asynchronous machine), FIG. 4e): 2-quadrant converter for feeding a current inverter having voltage reversal at the DC voltage network.

The following converters (2), for example, have 3 thyristor chains which require 3 drive modules:

FIG. 5a): a three-phase bridge, 1-phase sequencing circuit on the AC side,

FIG. 5b): quasi 4-stage circuit,

FIG. 5c): voltage inverter for a star-connected asynchronous machine, and not represented: a 3-phase current-injecting converter having interphase commutation.

A logic may be seen in FIGS. 3-5 which can be applied to an arbitrary number of valve chains.

Figure 6:
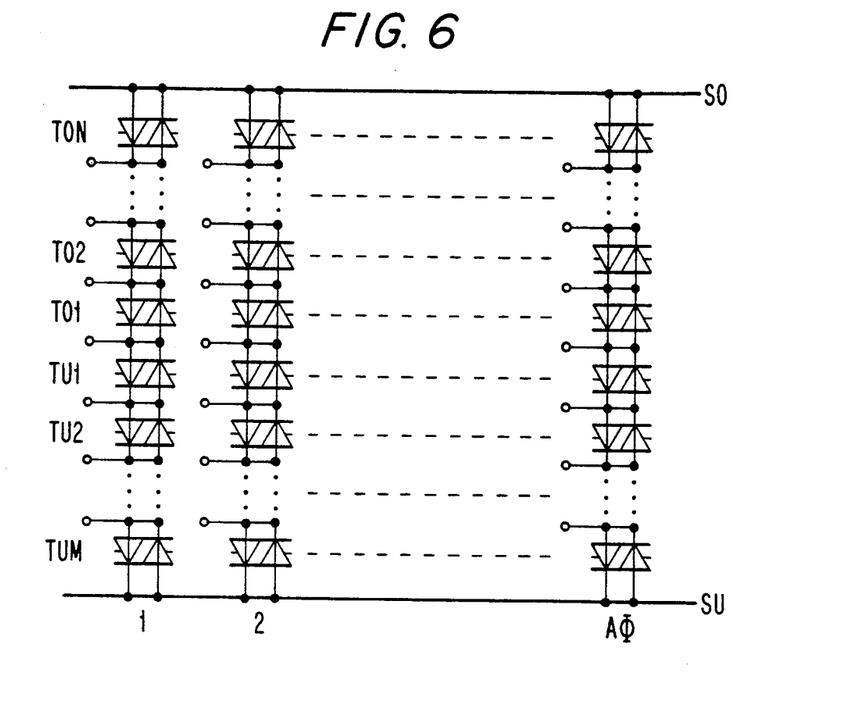
FIG. 6 shows a valve chain matrix for a multiphase multipoint converter.

FIG. 6 shows a converter (2) in matrix form for $A\Phi$ phases having $M+N$ series-connected valves or thyristors (TUM ... TON), which requires per phase 2 modulators (9) and 2 pulse generators (8). For such a converter, the valve chain length parameter is $PZ=M+N$ and the number of valve chains $AN=(1+DS)\cdot A\Phi\cdot AG\cdot A\epsilon$.

A pulse pattern shift is used to commutate bands of clock frequency harmonics. This shift apparently increases the resultant clock frequency ($f_t$) of the converter (2).

It is purely a matter of the parameter programing whether, for example, 6 chains of a converter are operated as 3 timing-offset, but co-phasal input circuits of a 4-quadrant converter, or as 3 phases of an inverter that are not timing-offset but shifted by 120° in each case, or as 6 2-quadrant converters. In this case, either the phase shift or the timing offset is programed.

The free programing and the multiple parallel design of such converters (2), such as is practiced on the line side, makes it possible to go over automatically to pulse pattern shifts in which the current network is loaded with a minimum of harmonics simply by setting a corresponding parameter, even in the event of a partial failure of the installation.

In the 3-phase converter (13, 14) represented in FIG. 2, both the fundamental-wave phase angles and the pulse pattern phase angles must be programed separately.

Figure 7:
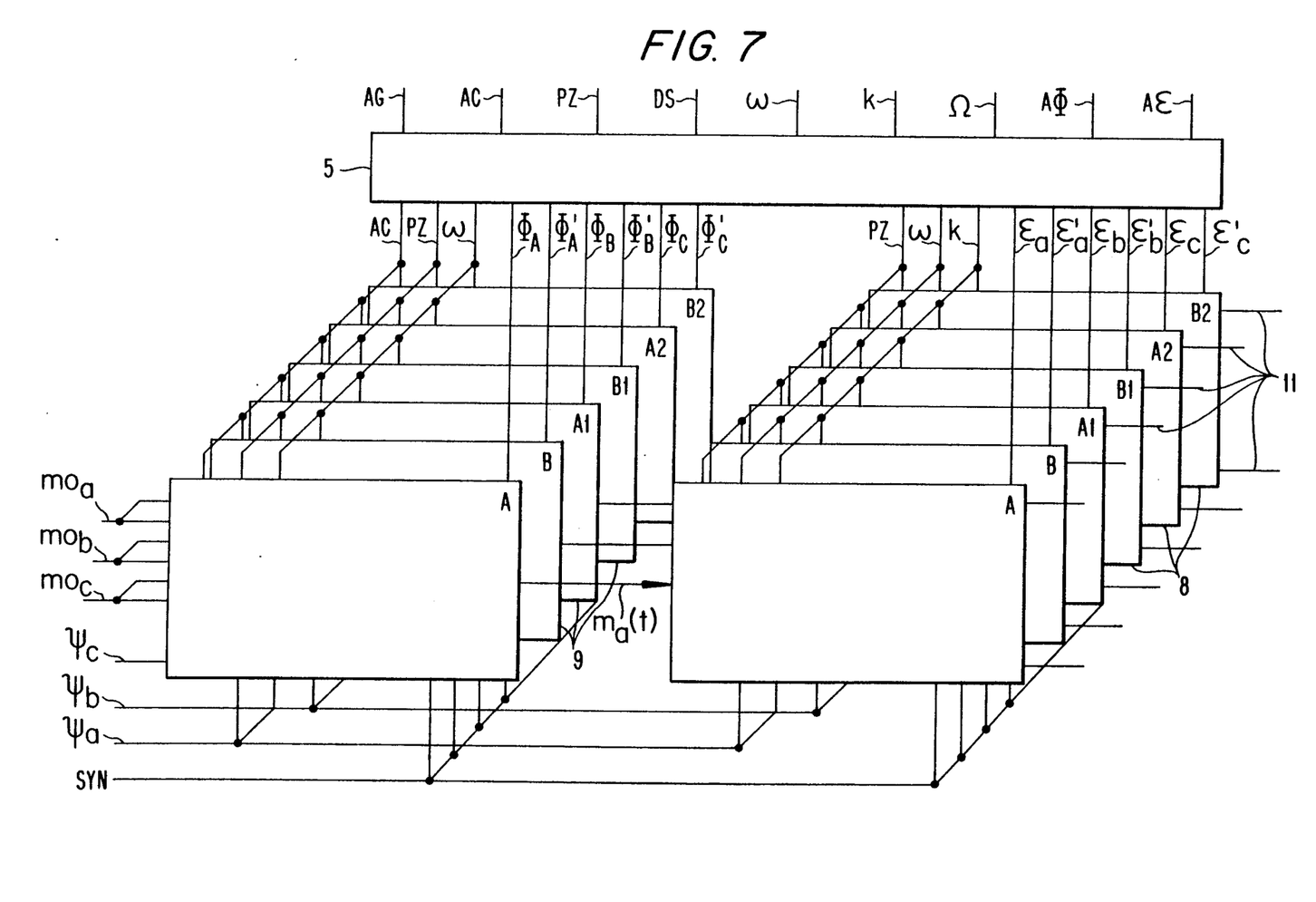
FIG. 7 shows a block diagram of a pilot signal generator for a 3-circuit-4-quadrant converter.

FIG. 7 shows a pilot signal generator (10) for a 3-circuit-4-quadrant converter. 2 modulators (9) and 2 pulse generators (8), which are denoted by A, B or A1, B1 or A2, B2, are provided per circuit. The cophasality of the fundamental-wave of the modulators (9) can be programed individually via initial angular position signals ($\Phi_A$, $\Phi'_A$; $\Phi_B$, $\Phi'_B$; $\Phi_C$, $\Phi'_C$). The same holds for the mutual pulse pattern shift in the pulse generators (8) between the double-fed circuits by means of individually programed initial values of the pulse pattern angular position ($\epsilon_a$, $\epsilon'_a$; $\epsilon_b$, $\epsilon'_b$; $\epsilon_c$, $\epsilon'_c$). 2 modulators (9) are each prescribed modulation depth parameters ($mO_a$) or ($mO_b$) or ($mO_c$) by controllers (12). The controllers (12) also deliver a controller correction angle signal ($\psi_a$) or ($\psi_b$) or ($\psi_c$) per circuit to the modulators (9) and the pulse generators (8). Common synchronization with a reference point can be switched on or switched off. The angular frequency ($\omega$) can also be set by the setter (5). The controller output Hvariables could also be combined to form one vector variable.

The initial angular position signals ($\Phi_A$, $\Phi'_A$; $\Phi_B$, $\Phi'_B$; $\Phi_C$, $\Phi'_C$) are calculated in the setter (5) in accordance with the following equations, on the basis of an initial angle of, for example, $\Phi_0=0$ and an angular rotation of $\Delta\Phi=2\cdot\pi/A\Phi$:

$$\Phi_i=\Phi_0+\Delta\Phi\cdot(i-1),$$

$$\Phi'_i DS=\Phi_i+\pi,$$

$$1\leq i\leq A\Phi.$$

The modulation functions $m_a(t)$, $m_b(t)$, $m_c(t)$ at the output of the modulator (9) are derived therefrom by substituting a or b or c for i in the equation for $m_i(t)$. For the sake of clarity, only the modulation function $m_a(t)$ is illustrated. The modulation functions $m_a'(t)$, $m_b'(t)$, $m_c'(t)$, likewise not illustrated, for the twin chains are derived from the modulation functions $m_a(t)$, $m_b(t)$, $m_c(t)$ by substituting $\Phi'_i$ for $\Phi_i$ in their equations.

Initial values for the pulse pattern shift are: $\Delta\epsilon=2\cdot\pi/((DS+1)\cdot k\cdot A\epsilon)$ and $\epsilon_0=\pi/(k\cdot(DS+1))$ for $(k+PZ-1)/(4-2\cdot DS)-\text{ent}\{(k+PZ-1)/(4-2\cdot DS)\}=0$, otherwise $\epsilon_0=0$. In this case, ent(x) denotes the largest integer $\leq x$. $\epsilon_0$ specifies the synchronization value of the pulse pattern angular position.

With these values, the initial values of the pulse pattern angular position ($\epsilon_a$, $\epsilon'_a$; $\epsilon_b$, $\epsilon'_b$; $\epsilon_c$, $\epsilon'_c$) are receiveed from the setter (5) in accordance with the following equations:

$$\epsilon_j=\epsilon_0+\Delta\epsilon\cdot(j-1),$$

$$\epsilon'_j DS=\epsilon_j+(PZ-2)\cdot 90 /k+(1-AC)\cdot\pi/k,$$

$$1\leq i\leq A\Phi.$$

The signals marked with an apostrophe (') hold for valve chains which as double-feed chains (DS=1) have an exactly definable phase and pulse pattern position in relation to a twin chain without apostrophe.

Thus, the multilevel functions $KF_{aj}$, $KF_{bj}$, $KF_{cj}$ are calculated in the pulse generator (8) by substituting a or b or c for i in the equation for $KF_{ij}$. The multilevel functions $KF'_{aj}$, $KF'_{bj}$, $KF'_{cj}$ for the twin chains are derived from the multilevel functions $KF_{aj}$, $KF_{bj}$, $KF_{cj}$ by substituting $m_a'(t)$ or $m_b'(t)$ or $m_c'(t)$ for $m_a(t)$, $m_b(t)$, $m_c(t)$, and $\epsilon'j$ for $\epsilon j$ in their equations.

Denoting the reference potential of the zero terminal (U0) by LU0, it holds that: $LU0=0.5+\text{ent}((PZ-2)/2)$.

The number N of the thyristors above the zero terminal (U0) is $N=PZ/2$ for $PZ/2-\text{ent}(PZ/2)=0$; otherwise, $N=PZ/2+0.5$. The number M of the thyristors below the zero terminal (U0) is $M=PZ-N$.

Thus, the pilot signals (11) or ($LTON_i-LTUM_i$) for the thyristors (TON−TUM) are calculated with respect to the phase i having a pulse pattern j in accordance with the following equations:

$$LTON_{ij} = H(KF_{ij}(t) - LU0 - N + 1),$$
$$\vdots$$
$$LTO2_{ij} = H(KF_{ij}(t) - LU0 - 1),$$
$$LTO1_{ij} = H(KF_{ij}(t) - LU0),$$
$$LTU1_{ij} = H - KF_{ij}(t) + LU0),$$
$$LTU2_{ij} = H(-KF_{ij}(t) + LU0 - 1),$$
$$\vdots$$
$$LTUM_{ij} = H(-KF_{ij}(t) + LU0 - M + 1).$$

In this case, H(x) is the so-called Heaviside function, for which it holds that: $H(x)=1$ for $x \geq 0$ and $H(x)=0$ for $x<0$.

For the upper thyristors (TO1−TON) of the i-th phase or valve chain, it thus holds for the pilot 21.0 signals (11) or ($LTOn_{ij}$), starting from the zero terminal (U0), that:

$$LTO_{nij} = H(KF_{ij}(t) - LU0 - n + 1), 1 \leq n \leq N.$$

A corresponding result holds for the pilot signals (11) or ($LTUn_{ij}$) of the lower thyristors (TU1−TUM), starting from the zero terminal (U0):

$$LTU_{nij} = H(-KF_{ij}(t) + LU0 - n + 1), 1 \leq n \leq M.$$

Figure 8:
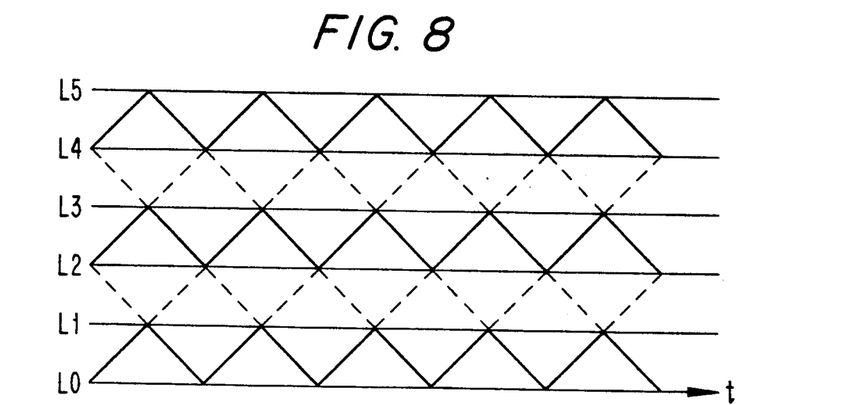
FIG. 8 shows an auxiliary voltage network for the timing algorithm.

FIG. 8 shows an auxiliary voltage network of the timing algorithm or of the commutation function $KF_{ij}(t)$. The commutation function $KF_{ij}(t)$, which uniquely describes the circuit state of a valve chain, is increased or decreased by the value 1 at each intersection of the modulation function ($m_i(t)$) with voltage level lines ((L0−L5), which correspond to the voltages at the valve terminals (UM−ON). The change corresponds to the derivative of the modulation function ($m_i(t)$). The auxiliary voltage network explains the production of the multilevel commutation function $KF_{ij}$ from the intersections of the network with the modulation function $m_i(t)$.

A few exemplary embodiments, in which reference is made to the designations in FIG. 2 with the associated description, are given below. The symbols for the phases (R, S, T) are also generalized by the control variable i, i=1 corresponding to a single phase or the phase (R) etc.

A converter matrix of 6 4-stage 2-quadrant converters with current reversal can be operated as:
- 6 2-quadrant converters (current converter, voltage converter),
- 3 4-quadrant converters with PZ=2 or 3 or 4,
- 2 1-pulse 3-phase inverters with PZ=2 or 3 or 4,
- 1 2-pulse 3-phase inverter with PZ=2 or 3 or 4, or
- a mixture of these circuits.

EXAMPLE 1

Timing algorithm for a matrix converter having 6 2-quadrant converters, PZ=2 (current or voltage converter):

Setter content: AG=3, AC=0, PZ=2, DS=1, $\omega = 2 \cdot \pi \cdot f$, $f = 16\frac{2}{3}$ Hz, k=12, $\Omega = k \cdot \omega$, $A\Phi=1$, $A\epsilon=3$.

Individual input signals of the modulator (9): $mO_i=0.75$, $\psi_i=\pi/4$, $\Phi_0=0$, $\Phi_A$, $\Phi'_A$; $\Phi_B$, $\Phi'_B$; $\Phi_C$, $\Phi'_C$.

Individual input signals of the pulse generator (8): $\epsilon_a$, $\epsilon'_a$; $\epsilon_b$, $\epsilon'_b$ $\epsilon_c$, $\epsilon'_c$; n1=20; $m_a(t)$, $m_a'(t)$; $m_b(t)$, $m_b'(t)$; $m_c(t)$, $m_c'(t)$.

Pilot signals (11): $LTO1_{ij}$, $LTU1_{ij}$.

EXAMPLE 2

Timing algorithm for a matrix converter having 3 4-quadrant converters, PZ=2:

Setter content: AG=3, AC=1, PZ=2, DS=1, $\omega = 2 \cdot \pi \cdot f$, $f = 16\frac{2}{3}$ Hz, k=11, $\Omega = k \cdot \omega$, $A\Phi=1$, $A\epsilon=3$.

Individual input signals of the modulator (9) and of the pulse generator (8), as well as pilot signals (11) correspond to Example 1. The same also holds for the next example.

EXAMPLE 3

Timing algorithm for a matrix converter having 2 1-pulse 3-phase inverters, PZ=2:

Setter content: AG=2, AC=1, PZ=2, DS=0, $\omega = 2 \cdot \pi \cdot f$, $f = 16\frac{2}{3}$ Hz, k=11, $\Omega = k \cdot \omega$, $A\Phi=3$, $A\epsilon=1$.

The invention is particularly suitable for multisystem locomotives. The power circuit of a locomotive, designed with a minimum number of switches, is changed over to the other feed system by a simple reprograming of the modulator (9). The multisystem capability of the locomotive is ensured with only one controlling electronic system. The universality of the algorithm employed permits a reduction in complexity and costs in the execution of standard projects.

The output signal $m_i(t)$ of the modulator (9) represents a time-dependent variable which can be interpreted in a manner similar to the control voltage in conventional instrumentation and control. Said function $m_i(t)$ can also, as previously, be realized as a part of the controller (12), which has to deliver time-dependent variables. The interface between the controller (12) and the modulator (9) is then more complex.

The most important novelty is to be found in the pulse generator (8), to which the modulation function ($m_i(t)$) is fed.

By contrast with the present invention, in conventional pulse generators a saw-tooth auxiliary voltage is intersected by a sinusoidal control voltage, the interfaces producing the pilot signals for the thyristors. In the pulse generator (8) described, by contrast, one has to speak in an analogous way of intersections of the control voltage with the auxiliary network (FIG. 8).

Special modulation functions ($m_i(t)$) can be used for special modulations.

For a rectangular modulation of arbitrary pulse width it holds that:

$$m_i(t) = mO_i + (2/\pi) \cdot \sum_{n=1}^{n2} [\sin(n \cdot mO_i \cdot \pi) \cdot \cos(n \cdot (\omega \cdot t - \Phi_i - \psi_i))]/n,$$

where n denotes a control variable, n2 an accuracy characteristic.

For the special case of a rectangular modulation of 180° pulse width it holds that:

$$m_i(t) = mO_i \text{ for } \cos(\omega \cdot t - \Phi_i)) \geq 0,$$

otherwise $m_i(t)=0$.

For a triangular modulation it holds that:

$$m_i(t) = mO_i \cdot \left( 0.5 + (4/\pi^2) \cdot \sum_{n=1}^{n2} [\cos((2 \cdot n - 1) \cdot \right.$$

-continued $$(\omega \cdot t - \Phi_i - \psi_i))]/(2 \cdot n - 1)^2 \Big\}.$$

For a trapezoidal modulation it holds that:

$$m_i(t) = 0.5 + (4 \cdot mO_i/(\pi \cdot a)) \cdot \sum_{n=1}^{n2} [\sin(2 \cdot n - 1) \cdot$$

$$a/(2 \cdot n - 1)^2] \cdot \sin((2 \cdot n - 1) \cdot (\omega \cdot t - \Phi_i - \psi_i)),$$

where $a$ denotes half the difference between the lengths of the largest and smallest parallel sides of the trapeze. The accuracy characteristic n2 is preferably in the numerical range between 20 and 100.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for controlling electric valves of a converter which has at least one valve or one valve chain per AC phase, comprising the steps of:
   a) driving the valves or valve chains of each AC phase with a mutual phase shift, and
   b) commutating the valves of the converter to regulate current output of the converter using control signals generated as a function of a commutation function $KF_{ij}(t)$, where:

$$KF_{ij}(t) = m_i(t) + (2/\pi) \cdot \sum_{n=1}^{n1} \{\sin(n \cdot \pi \cdot m_i(t)) \cdot$$

$$\cos(n \cdot k \cdot (\omega \cdot t - (\epsilon_j + \Phi_i + \psi_i)))\}/n,$$

wherein t=time, $m_i(t)$=modulation function, n=control variable with $1 \leq n \leq n1$, n1=accuracy characteristic, i=control variable for characterizing the AC phase with $1 \leq i \leq A\Phi \cdot AG$, $A\Phi$=number of valve chains with fundamental-wave shift, AG=number of valve chains having the same fundamental-wave phase, j=control variable for characterizing a pulse pattern with $1 \leq j \leq A\epsilon \cdot A\Phi$, $A\epsilon$=number of independent valve chains with shifted pulse pattern, k=multiplicity of timing, $\omega$=angular frequency of the AC voltage, $\Phi_i$=prescribable phase angle, $\psi_i$=controller correction angle, and $\epsilon_j$=initial value of the jth pulse pattern of the valve chain circuit with the same index i.

2. The method as claimed in claim 1, wherein the modulation function ($m_i(t)$) is formed in accordance with:

$$m_i(t) = (PZ - 1) \cdot$$

$$\{AC + mO_i \cdot \cos(AC \cdot (\omega \cdot t - (\Phi_i + \psi_i)))\}/(AC + 1)$$

with t denoting the time, the index i a control variable for characterizing the AC phase, PZ the number of controllable valves of a valve chain, AC an operating current parameter with AC=1 for AC/AC voltage operation and AC=0 for DC/DC voltage operation, $mO_i$ a prescribable parameter of the modulation depth, $\omega$ the angular frequency of the AC voltage, $\psi i$ a prescribable phase angle or controller correction angle, and $\Phi i$ the initial angular position of the i-th AC phase.

3. The method as claimed in claim 1, wherein the modulation function ($m_i(t)$) is formed in accordance with:
   a)

$$m_i(t) = mO_i + (2/\pi) \cdot \sum_{n=1}^{n2} \{\sin(n \cdot mO_i \cdot \pi) \cdot$$

$$\cos(n \cdot (\omega \cdot t - \Phi i - \psi i))\}n,$$

or
   b)

$$m_i(t) = mO_i \text{ for } \cos(\omega \cdot t - \psi_i) \geq 0, \text{ otherwise } m_i(t) = 0$$

or
   c)

$$m_i(t) = mO_i \cdot \left\{ 0.5 + 4/\pi^2 \right) \cdot \sum_{n=1}^{n2} \{\cos((2 \cdot n - 1) \cdot$$

$$(\omega \cdot t - \Phi i - \psi i))/(2 \cdot n - 1)^2 \right\}$$

or
   d) for trapezoidal modulation $$m_i(t) = 0.5 + (4 \cdot mO_i/(\pi \cdot a)) \cdot \sum_{n=1}^{n2} \{\sin(2 \cdot n - 1) \cdot$$

$$a/2(2 \cdot n - 1)^2\} \cdot \sin((2 \cdot n - 1) \cdot (\omega \cdot t - \Phi i - \omega i))$$

with t denoting the time, the index i a control variable for characterizing the AC phase, $mO_i$ a parameter of the modulation depth, n2 an accuracy characteristic, $\omega$ the circuit frequency of the AC voltage, $\Phi_i$ a prescribable phase angle, $\psi_i$ a controller correction angle and $a$ half the difference between the largest and smallest parallel side of a trapeze.

4. The method as claimed in claim 1, wherein
   a) the commutation function $KF_{ij}(t)$ is formed separately in an identically designed pulse generator for each valve chain of a converter having a plurality of valve chains, and
   b) the parameters of the commutation function $KF_{ij}(t)$ are initialized by a higher-order setter.

5. The method as claimed in claim 1, wherein
   a) the modulation function ($m_i(t)$) is formed separately in an identically designed modulator for each valve chain of a converter having a plurality of valve chains, and
   b) the parameters of the modulation function ($m_i(t)$) are initialized by a higher-order setter.

6. The method as claimed in claim 1, wherein depending on the commutation function $KF_{ij}(t)$ pilot signals are formed for controllable valves in accordance with:

$$LTOn_{ij} = H(KF_{ij}(t) - LU0 - n + 1), 1 \leq n \leq N$$

for controllable valves between a zero terminal and a positive busbar, starting from the zero terminal, and in accordance with:

$$LTUn_{ij} = H(-KF_{ij}(t) - n + 1), 1 \leq n \leq M$$

for controllable valves between the zero terminal and a negative busbar, starting from the zero terminal, i denoting a control variable for characterizing the AC phase, j a control variable for characterizing the pulse pattern, H(x) the Heaviside function, and $$LU0 = 0.5 + ent(PZ-2)/2)$$

the reference potential of the zero terminal, $PZ = N + M$ = number of controllable valves of a valve chain.

7. The method as claimed in claim 1, wherein
   a) the at least one modulator
   b) and/or the at least one pulse generator are controlled as a function of at least one output signal of an upstream controller.

8. The method as claimed in claim 4, wherein data or parameters stored and/or formed in the setter are delivered periodically to the at least one modulator and to the at least one pulse generator.

9. The method as claimed in claim 1, wherein the mutual phase shift of the AC phases or the initial angular position signals are calculated in accordance with the following equations on the basis of an initial signal $\Phi 0$ and an angular difference $\Delta\Phi = 2\cdot\pi/A\Phi$:

$$\Phi i = \Phi 0 + \Delta\Phi\cdot(i-1),$$

$$\Phi'i\cdot DS = \Phi_i + \pi,$$

$1 \leq o \leq A\Phi$, $A\Phi$ = number of valve chains having fundamental-wave shift, and/or the initial valves of the pulse pattern angular position are formed in accordance with the following equations:

$$\epsilon j = \epsilon 0 + \Delta\epsilon\cdot(j-1),$$

$$\epsilon' j\cdot DS = \epsilon j + (PZ-2)\cdot\pi/k + (1+AC)\cdot\pi/k,$$

where:
$1 \leq j \leq A\epsilon$, $A\epsilon$ = number of independent valve chains with shifted pulse pattern, $\Delta\epsilon = 2\cdot\pi/((DS+1)\cdot k\cdot A\epsilon)$ and
$\epsilon 0 = \pi/(k\cdot(DS+1))$ for
$(k+PZ-1)/(4-2\cdot DS) - ent\{(k+PZ-1)/(4-2\cdot DS)\} = 0$, otherwise $\epsilon 0 = 0$,
ent (x) = largest integer $\leq$ x, DS = 1 for double-sided feed, otherwise DS = 0, PZ = number of controllable valves per valve chain.

10. The method as claimed in claim 1, wherein
   a) the initial value of the pulse pattern angular position is($\epsilon i$; $\epsilon R$, $\epsilon S$, $\epsilon T$; $\epsilon a$, $\epsilon' a$; $\epsilon b$, $\epsilon' b$; $\epsilon c$, $\epsilon' c$) = 0,
   b) and/or the number of thyristors connected in series per valve chain of the converter is = 1.

11. A method for controlling the switching of a converter used to drive an AC induction machine, the converter having at least one valve per AC phase of the converter, and the method comprising the steps of:
   inputting prescribed setting signals for controlling the converter;
   generating control signals for driving at least one switch for each AC phase of the converter with a mutual phase shift relative to a valve used to control at least one other phase of the converter, said step of generating further including the steps of:
   producing a time-dependent modulation function for establishing amplitude, frequency and phase of current output by the converter; and
   providing said control signals in response to said modulation function using a commutation function $KF_{ij}(t)$ where:

$$KF_{ij}(t) = m_j(t) + (2/\pi)\cdot\sum_{n=1}^{n1}\{\sin(n\cdot\pi\cdot m_j(t))\cdot\cos(n\cdot k\cdot(\omega\cdot t - (\epsilon j + \Phi i + \psi i)))\}/n,$$

wherein t = time, $m_j(t)$ = modulation function, n, i, j = control variable, n1 = accuracy characteristic, k = multiplicity of timing, $\omega$ = angular frequency of the AC voltage, $\Phi_i$ = prescribable phase angle, $\psi_i$ = controller correction angle, and $\epsilon j$ = initial value of the pulse pattern position of the j-th valve chain with shifted pulse pattern (see page 7, lines 1-11).

* * * * *